Jan. 18, 1966     M. A. GROGEL     3,229,886
PIE PLATE CONSTRUCTION
Filed July 31, 1963                 6 Sheets-Sheet 1

INVENTOR.
MERRILL A. GROGEL

BY Glenn, Palmer & Matthews
HIS ATTORNEYS

INVENTOR.
MERRILL A. GROGEL
BY
HIS ATTORNEYS

Jan. 18, 1966    M. A. GROGEL    3,229,886
PIE PLATE CONSTRUCTION
Filed July 31, 1963    6 Sheets-Sheet 3

INVENTOR.
MERRILL A. GROGEL
BY
HIS ATTORNEYS

INVENTOR.
MERRILL A. GROGEL
BY Glenn, Palmer & Matthews
HIS ATTORNEYS

INVENTOR.
MERRILL A. GROGEL

BY Glenn, Palmer
& Matthews
HIS ATTORNEYS

3,229,886
PIE PLATE CONSTRUCTION
Merrill A. Grogel, Henrico County, Va., assignor to Reynolds Metals Company, Richmond, Va., a corporation of Delaware
Filed July 31, 1963, Ser. No. 299,052
4 Claims. (Cl. 229—3.5)

This application is a continuation-in-part of the copending application, Serial Number 239,022, filed November 20, 1962, and now abandoned, and entitled, "Pie Plate Construction and Method and Apparatus for Making the Same."

This invention relates to an improved cupshaper receptacle, such as a pie plate or the like, and to improved methods and apparatus for making the same.

It is well known to form pie plates or receptacles from sheets of relatively thin metallic foil, such as aluminum-containing metallic foil or the like, wherein each pie plate has a substantially flat bottom wall means surrounded by an upstanding relatively shallow straight side wall means extending upwardly and outwardly from the bottom wall means, the side wall means having an outwardly directed peripheral flange at the outer upper edge thereof. Such pie plates are normally utilized to carry pre-made frozen pies that are subsequently merchandised in substantially rectangular cartons surrounding the filled pie plates whereby the ultimate consumer subsequently bakes the frozen pies in their respective metal foil pie plates.

In order to make such foil pie plates relatively economical, the foil sheets forming such plates must be relatively thin.

However, it has been found that when relatively thin metallic foil sheets, such as aluminum-containing foil sheets, are utilized, the conventional slanted side wall means of the pie plates lack desirable structural strength to hold the pies in the desired shape during the baking thereof.

Accordingly, the thickness of the sheets of metallic foil being utilized was dictated by the structural strength required for the pie plates.

However, it was found that if the conventional slanted wall means of such a prior known receptacle was provided with an annular groove and the peripheral flange thereof was bent slightly downwardly, the slanted side wall was reinforced in such a manner that a thinner sheet of metallic foil could be utilized to form a pie plate having the same structural strength as a prior known pie plate formed of a thicker sheet of metallic foil.

While this prior known pie plate seemed to solve the problem of making metallic foil pie plates out of thinner sheets of metallic foil, it has been subsequently found that the same has certain undersirable features.

For example, it has been found that the annular groove formed in the side wall means of the pie plate receptacle tended to cause the receptacle to hang up on a manufacturer's pie plate holder in the pie filling machinery whereby production time was lost in righting such canted pie plate receptacles in order to permit the pie making machinery to function properly.

Further, it was found that such annular groove in the side wall means of the prior known pie plate receptacle provided a weakness in the upstanding wall of the pie crust whereby a cut piece of pie tended to fracture at such annular groove and thereby destroy the attractiveness of the cut piece of pie.

However, according to the teachings of this invention, an improved pie plate receptacle is provided which overcomes the above disadvantages while still permitting the pie plate receptacle to be made from a thinner sheet of metallic foil than the sheet of metallic foil forming the conventional pie plate receptacle or even the grooved pie plate receptacle.

Further, it has been found that the improved pie plate receptacle of this invention has additional advantages over the prior known pie plate receptacles as will be set forth hereinafter.

In particular, one embodiment of the pie plate receptacle of this invention comprises a substantially flat bottom wall means surrounded by an upstanding side wall means that progressively curves upwardly and outwardly from the bottom wall means to the upper edge means of the side wall means whereby the upper edge means of the side wall means is disposed substantially vertically or substantially perpendicular relative to the bottom wall means. It has been found that such arcuate side wall means provides the necessary structural strength for the pie plate receptacle so that the same can be made from a thinner sheet of metallic foil than the sheet of material forming the conventional pie plate receptacle while still having the same structural strength.

Further, such arcuate side wall means permits the receptacle of this invention to automatically right itself in a manufacturer's pie plate holder in a manner not possible by the reinforcing annular groove previously described whereby no time is lost in the utilization of conventional pie making machinery.

In addition, such arcuate side wall means contours the upstanding wall of the crust of the pie in such a manner that the upstanding crust wall will not fracture when a piece of pie is cut as the upstanding crust wall has increased strength over prior known shaped pie crust walls to produce a piece of pie that has the attractive appearance of optimum juiciness and thickness.

In the embodiment of this invention previously described, it has been found that when the peripheral flange of the side wall means is bent downwardly, the same makes a more acute angle with the outer edge means of the arcuate side wall means than the angle provided by the slanted side wall means of the prior known receptacles whereby greater structural strength is provided for the side wall means of the pie plate receptacle of this invention than the structural strength provided by the depending peripheral flange of the prior known pie plate receptacle. In this manner, the pie plates of this invention can be formed from sheets of metallic foil that are substantially thinner than the sheets of metallic foil utilized to form the prior known receptacle while still having the same or greater structural strength.

In addition, it has been found that the peripheral flange of the above described receptacle can be substantially horizontal and be grooved in a manner hereinafter set forth to provide a receptacle having improved strength over the prior known receptacles.

Accordingly, it is an object of this invention to provide improved receptacle having one or more of the novel features of this invention set forth above or hereinafter shown or described.

Another object of this invention is to provide an improved method for making such a receptacle, or the like.

A further object of this invention is to provide an improved apparatus for making such a receptacle or the like.

Other objects, uses and advantages of this invention are apparent from a reading of this description which proceeds with reference to the accompanying drawings forming a part thereof and wherein:

While the various features of this invention are hereinafter described and illustrated as being particularly adaptable for forming a receptacle for containing frozen dessert pies, it is to be understood that the various features of this invention can be utilized singly or in any combination thereof to provide receptacles for other products as desired.

Therefore, this invention is not to be limited to only the embodiments illustrated in the drawings, because the drawings are merely utilized to illustrate one of the side variety of uses of this invention.

Figure 1:
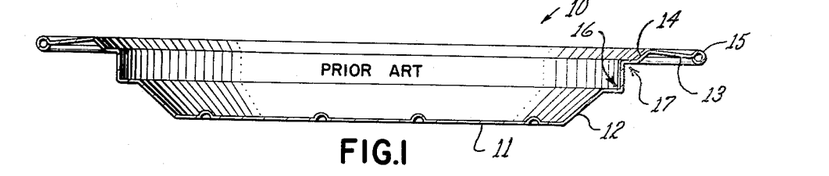
FIGURE 1 is an axial cross-sectional view illustrating a prior art receptacle.

Referring now to FIGURE 1, a prior known pie plate receptacle is generally indicated by the reference numeral 10 and comprises a substantially flat bottom wall means 11 surrounded by an outwardly and upwardly slanting side wall means 12 disposed at an angle relative to the bottom wall means 11 and having an outwardly directed peripheral flange 13 integrally interconnected to upper edge means 14 of the side wall means 12, the outer edge of the peripheral flange 13 terminating in a conventional annular bead 15 to add structural strength to the receptacle 10.

Such prior known pie plate receptacle 10 is formed by suitably stamping and drawing a relatively thin sheet of metallic foil, such as aluminum-containing metallic foil, or the like, and has the side wall means 12 thereof reinforced by one or more internal and external annular grooves 16 and 17 formed therein and by having the peripheral flange 13 bent downwardly in the direction of the bottom wall means 11.

In this manner, it has been found that the pie plate receptacle 10 could be formed of thinner sheets of metallic foil than conventional, slanting side wall, pie plate receptacles because the side wall means 12 thereof was reinforced by the annular grooves 16 and 17 and the depending peripheral flange 13.

However, as previously set forth, it has been found that when such prior known receptacle 10 is utilized in conventional pie plate filling machinery, the side wall means 12 thereof normally tends to have the annular groove-defining structure thereof hang up on the edge of a pie plate holder of the pie plate filling machinery in such a manner that the same cannot properly receive the pie making material whereby the pie making machine would have to be shut down until the canted pie plate receptacle 10 was manually righted.

Further, it can be seen that such prior art receptacle 10 would form the upstanding pie crust in a configuration provided by the side wall means 12 whereby the upstanding pie crust would tend to fracture at the annular grooves 16 and 17 when a piece of pie was being cut whereby the attractiveness of the cut piece of pie was destroyed.

However, according to the teachings of this invention, an improved pie plate receptacle is provided which can be formed from relatively thin sheets of metallic foil, such as aluminum-containing foil or the like, and have the same or greater structural strength than the prior art receptacle 10 while overcoming the disadvantages thereof and having other advantages over the same.

Figure 2:
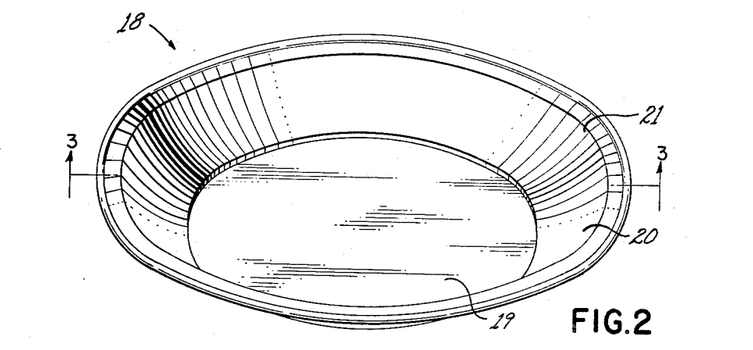
FIGURE 2 is a top perspective view of the improved receptacle of this invention.

In particular, an improved pie plate receptacle of this invention is generally indicated by the reference numeral 18 in FIGURES 2 and 3 and comprises a relatively thin sheet of metallic foil, such as aluminum-containing metallic foil or the like suitably stamped and drawn in the manner hereinafter described to define a substantially flat bottom wall means 19 surrounded by an upstanding side wall means 20 that progressively curves upwardly and outwardly from the bottom wall means 19 to upper edge means 21 of the side walls means 20 being disposed substantially vertically or substantially perpendicular relative to the bottom wall means 19.

It has been found that by so curving the side wall means 20 of the receptacle 18, the resulting pie plate receptacle 18 has increased structural strength over the conventional slanting side wall means of prior known containers without requiring annular grooves therein as in the prior art container 10 illustrated in FIGURE 1 whereby the smooth side wall means 20 of the pie plate receptacle 18 of this invention automatically rights the receptacle 18 in the pie plate holder of the pie filling machinery because no obstructions are provided on the side wall means 20 thereof.

In particular, when the prior known receptacle 10 is dropped manually or automatically into a cast iron form that is normally to grip the receptacle 10 at its upper edges under the peripheral flange 13, it has been found that the curved line of the receptacle 10 hangs on the edge of the holder causing production down time on the machine. However, the curved side wall means 20 of the receptacle 18 of this invention carries the edge of the receptacle 18 in an arc which lifts it over the edge of the plate holder making a failure all but impossible.

Further, since the upstanding pie crust wall conforms to the configuration of the curving side wall means 20 of the receptacle 18 of this invention, the upstanding pie crust wall is substantially stronger than the upstanding pie crust formed by the prior art container 10 so that the same remains intact when a piece of pie is cut to cause the cut piece of pie to have a maximum height and attractiveness not provided by the prior art container 10.

In particular, the curved pie crust wall produced by the receptacle 18 of this invention has the points of stress thereof distributed over more of the pie crust area whereby greater pie crust wall strength is provided without a fracture point or weakness area as provided by the annular grooves 16 and 17 of the prior known receptacle 10.

Figure 3:
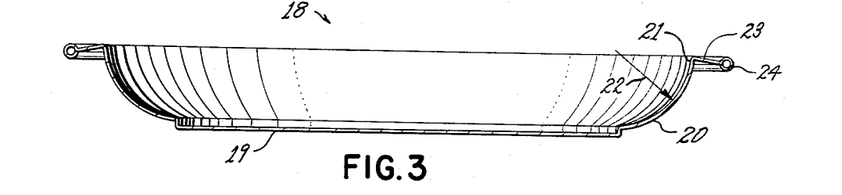
FIGURE 3 is an axial cross-sectional view of the receptacle illustrated in FIGURE 2 and is taken on line 3—3 thereof.

While the arcuate side wall means 20 of the receptacle 18 can be formed in any desirable manner to have the above features, the embodiment of the receptacle 18 illustrated in the drawings has the side wall means 20 thereof defined by a radius 22 that provides an arc from the bottom wall means 19 to the outer edge means 21 as illustrated in FIGURE 3.

For example, a conventional eight-inch pie plate receptacle 18 can have a bottom wall means 19 defined by a diameter of approximately 5.318 inches and the outer edge means 21 of the side wall means 20 defined by a diameter of approximately 7.318 inches whereby the radius 22 is approximately 1⅜ inches so that the overall height of the receptacle 18 is approximately 0.886 of an inch.

The pie plate receptacle 18 of this invention is provided with an outwardly directed peripheral flange 23 integrally interconnected at its inner edge to the outer edge means 21 of the side wall means 20 and terminates at its outer edge in an annular bead 24 in a conventional manner.

However, in order to add further structural strength to the side wall means 20 of the receptacle 18, the peripheral flange 23 is bent downwardly toward the bottom walls means 19, such as at an angle of approximately 10° relative to the horizontal, whereby the peripheral flange 23 defines a substantially acute angle relative to the substantially vertically disposed outer edge means 21 of the side wall means 20 whereas the depending peripheral flange 13 of the prior known receptacle 10 defines a relatively large obtuse angle with the upper edge means 14 of the side wall means 12 thereof.

It has been found that when the angle defined between the upper end means of the side wall means of a receptacle and the peripheral flange thereof is substantially acute rather than obtuse, greater structural strength is provided to the side wall means than before.

Therefore, it can be seen that the receptacle 18 of this invention has greater structural strength than the structural strength of the prior art receptacle 10 whereby the receptacle 18 of this invention can be formed from a thinner sheet of metallic foil than the sheet of metallic foil forming the prior art container 10 and still have the same structural strength thereof as well as eliminate the disadvantages thereof as previously described.

Further, the receptacle 18 of this invention has advantages over the prior art container 10 in addition to those previously set forth.

Figure 4:
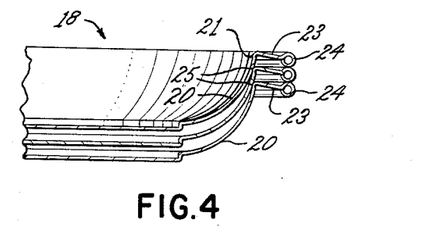
FIGURE 4 is a view similar to FIGURE 3 illustrating the nestability of the pie plate receptacles of this invention.

In particular, it can be seen from FIGURE 4 that the receptacles 18 of this invention are readily adapted to nest one within the other with the beads 24 thereof engaging the beads 24 of adjacent receptacles 18 while the side wall means 20 thereof abut the side wall means 20 of adjacent receptacles 18 at points 25 to prevent a vacuum condition from existing between adjacent receptacles 18 when the same are provided in a nested stack thereof.

By thus eliminating any such vacuum condition between nested receptacles 18, the nested receptacles 18 are readily adaptable for being utilized in conventional pie-making machinery because the same readily separate from each other when desired so that no time lost is provided in operating the conventional pie-making machinery to loosen and unnest receptacles thereof.

Further, because the upper edges 21 of the curved side wall means 20 of the receptacles 18 are more nearly vertical than conventional receptacles, a stack of receptacles 18 can be more readily controlled so that they pile vertically in neat alignment, bead 24 to bead 24.

Thus, this nesting feature is an important contribution because the receptacles 18 are easy to dispense with automatic receptacle freeing equipment, this automation, together with the security of the receptacles 18 properly being received in pie plate holders, makes reduction of labor on the conventional pie-making machinery possible.

Further, one of the important aggravations to the ultimate consumer of frozen dessert pies is the fact that the edge of the pie crust is often broken in distribution cycle as a result of shipping damage of the filled receptacle 10 in this conventional rectangular carton. This crust breakage is exaggerated by the conventional slanting side wall means of the prior known receptacles because the inertia of movement of the filled receptacle causes the pies to slide horizontally in the pie plate receptacle and fracture the crust against the inside wall of the carton. In the curved side wall means 20 of the pie plate receptacle 18 of this invention, the horizontal line of movement of the pie is interrupted by the nearly vertical upper edge means 21 of the side wall means 20 which reduces horizontal movement almost entirely.

While pie damage may also be caused when the package is turned upside down, that part that is caused by the movement of the pie in the pie plate receptacle 18 will be eliminated by the new construction of this invention.

Inasmuch as it is determined that the average housewife saves and re-uses these foil pie plate receptacles for many such food serving applications in and about the home, it can be seen that the esthetic charm of the curved side wall means 20 of the pie plate 18 of this invention is a basic advantage over the same mechanical structure of the conventional standard slanting side wall plate receptacles. This advantage enhances the premium value of the pie plate receptacle 18 in the home as a useful food receptacle. One outstanding application resulting from this advantage and appearance is a possible use of the pie plate receptacle 18 as a luncheon plate for heating and serving picnic meals and the like.

The several advantages of the pie plate receptacle 18 of this invention outlined above can be achieved in the design of the pie plate receptacle of various dimensions, such as wide or narrow peripheral flanges 23 with steep or shallow side wall angles, or with deep or shallow vertical dimensions by plotting the functional line of movement of the plate into the plate holder. This plot line will accomplish the plate dropping mechanical advantages and still permit the curve to be continuous from top to bottom of the plate or, in other instances, would be composed of a curve from the top of the plate downward to a point where it is blended with a straight line joining the bottom of the plate at the curve. This manipulation of the side wall to accomplish both mechanical and crust protection advantages is an important feature of this invention.

Figure 5:
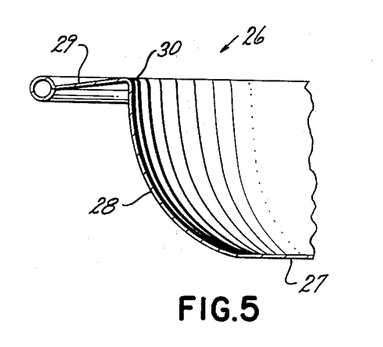
FIGURE 5 is a fragmentary cross-sectional view similar to FIGURE 3 illustrating another embodiment of this invention.
Figure 6:
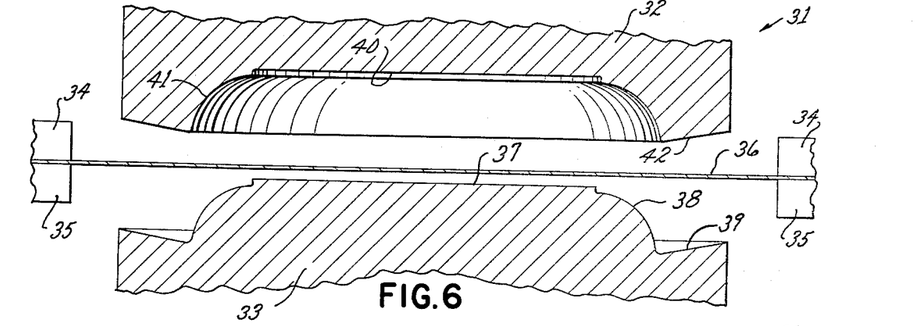
FIGURES 6–9 are schematic cross-sectional views illustrating the apparatus of this invention for forming the pie plate receptacle of FIGURE 2.

For example, reference is made to FIGURE 5 wherein another pie plate receptacle of this invention is generally indicated by the reference numeral 26 and comprises a bottom wall means 27 surrounded by an upwardly and outwardly curving side wall means 28 having a peripheral flange 29 integrally interconnected to the outer edge means 30 of the side wall means 28.

While the receptacle 26 of this invention appears to be substantially the same as the receptacle 18 previously described, the side wall means 28 of the receptacle 26 is not defined by a true radius from the bottom wall means 27 to the outer edge means 30 whereby the outer edge means 30 of the side wall means 28 of the receptacle 26 is more substantially vertical and defines a more acute angle with the peripheral flange 29.

Therefore, it can be seen that various pie plate receptacles can be made by the teachings of this invention while still having all or some of the important advantages as set forth above.

In the manufacture of foil plate receptacles, the foil pie plate receptacles are formed by stamping and drawing a sheet of metallic foil whereby wrinkles form in the side wall means thereof more or less at random as the metal sheet is drawn in a straight line between the outer edge of the female former die part and the inner edge of the male die former part. This relationship makes accurate forming and distribution of wrinkles a delicate machine adjustment, it be well known that such side wall wrinkles add structural strength to the side walls and, the more uniform the wrinkles, the greater the strength.

However, in the curved side wall construction of this invention, the metal sheet is progressively wrapped down over the curving side of the male die member to keep the metal in tension against the male die member for better control and a stronger wrinkle construction.

For example, an improved apparatus and method of this invention for making the pie plate receptacle 18 of this invention is generally indicated by the reference numeral 31 in FIGURES 6–9 and comprises a female die member 32, a cooperable male die member 33 and cooperating foil sheet holders 34 and 35, the holders 34 and 35 cooperating together to hold a sheet of metallic foil 36 therebetween whereby the female die member 32 and the male die member 33 can come together, either by simultaneously moving both die members 32 and 33 toward each other or by moving one of the die members 32 or 33 relative to the other die member, as desired.

The male die member 33 has a bottom wall forming surface 37 surrounded by an annular convex side wall forming surface 38 which forms the side wall means 20 of the receptacle 18 in a manner hereinafter described, the annular convex surface 38 joining a peripheral flange forming surface 39.

The female die member 32 has a cooperating bottom wall forming surface 40 surrounded by an annular concave side wall forming surface 41 joining a peripheral flange forming surface 42.

Figure 7:
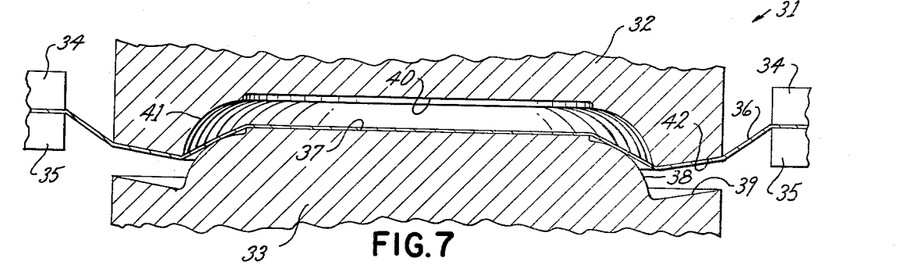
Figure 8:
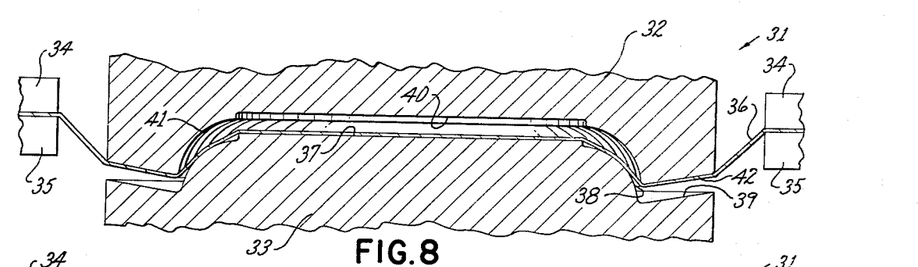

In the embodiment of the apparatus 31 illustrated in the drawings the female die member 32 is moved relative to the stationary male die member 33 in the manner illustrated in FIGURES 7 and 8 whereby it can be seen that the female die member 32 forms the sheet of metallic foil 36 about the male die member 33 in such a manner that before the sheet of material 36 is completely formed around the male die member 33, the sheet of metallic foil 36 is progressively wrapped downwardly into engagement around the convex side wall forming surface 38 of the male die member 33 in the manner illustrated in FIGURE 7 and brings the control of the side wall wrinkles under greater security, eliminating the random formation problems which now result in a wide variation of pie plate strength.

Figure 9:
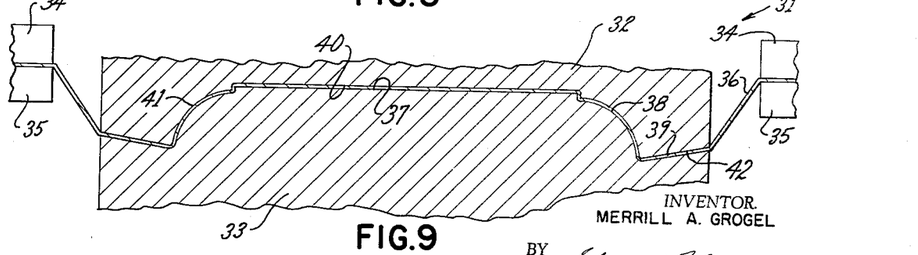

Thus, it can be seen that as the female die member 32 and male die member 33 progressively come together into the final position illustrated in FIGURE 9, the sheet of metallic foil 36 is progressively wrapped downwardly around the annular surface 38 of the male die member 33 in a manner that cannot be provided by slanting side wall forming surfaces for producing the prior art container 10 of FIGURE 1 whereby the wrinkles in the side wall means 20 of the receptacle 18 of this invention are substantially controlled and uniform to provide greater structural strength to the side wall means 20 of the receptacle 18 than would be provided if the same were randomly disposed as is provided in the side wall means 12 of the prior art receptacle 10.

Therefore, it can be seen that this invention not only provides an improved pie plate receptacle, but also improved methods and apparatus for making the same.

Thus, one of the most important basic advantages of the pie plate receptacle 18 of this invention which produces a stronger pie plate construction than conventional designs in a given thickness of metal foil is that by designing a level of strength, it becomes possible to produce a pie plate receptacle of greater economy and metal, and, at the same time, capture additional economies and efficiency of applying this pie plate receptacle to conventional pie-making processes.

Figure 10:
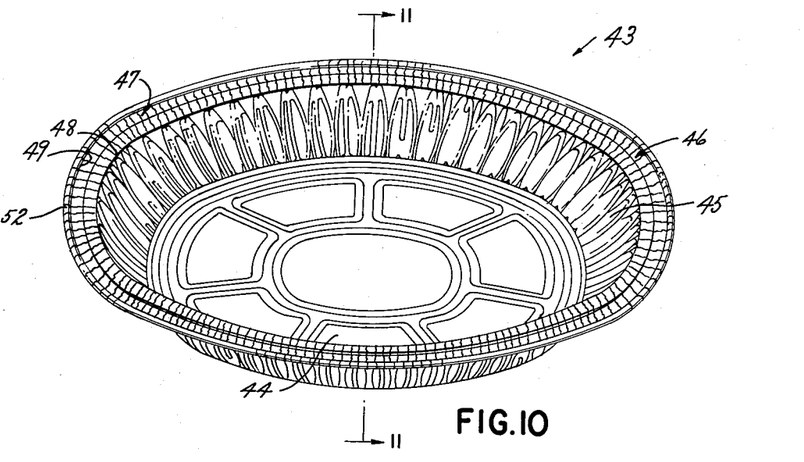
FIGURE 10 is a perspective view of another receptacle of this invention.
Figure 11:
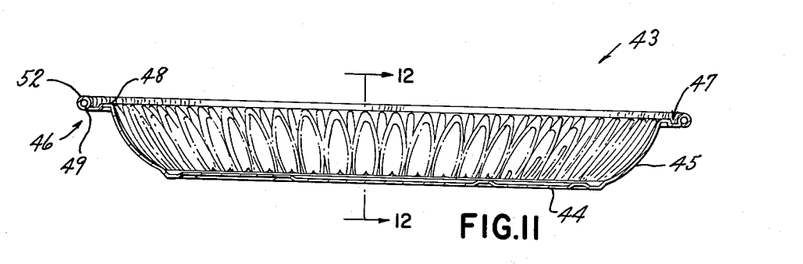
FIGURE 11 is a cross-sectional view taken on line 11—11 of FIGURE 10.
Figure 12:
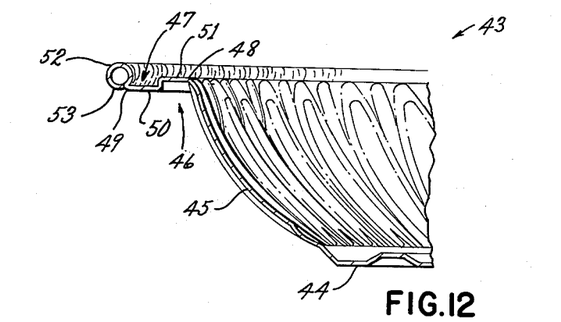
FIGURE 12 is an enlarged, fragmentary cross-sectional view taken on line 12—12 of FIGURE 11.

Another receptatcle of this invention is generally indicated in FIGURES 10–12 by the reference numeral 43 and is substantially the same as the receptacle 18 previously described except that the receptacle 43 has different means for adding strength to the peripheral flange thereof.

In particular, the receptacle 43 includes a bottom wall 44, which can be embossed as illusrated or remain plain as desired, and an upwardly and outwardly curving side wall 45 having the same advantages and features of the side walls 20 and 28 previously described.

However, the peripheral flange 46 of the receptacle 43 is substantially horizontal and is given added strength by having the same grooved.

In particular, the peripheral flange 46 of the receptacle has an upwardly facing groove 47 formed intermediate its ends 48 and 49, the groove 47 defining a flat wall portion 50 disposed substantially horizontal and parallel to the ungrooved portion 51 thereof.

This stepped or grooved feature of the peripheral flange 46 has been found to add structural strength to the peripheral flange to permit the receptacle 43 to be readily utilized in conventional pie-filling machinery or the like.

The peripheral flange 46 of the receptacle 43 has an annular reinforcing bead 52 formed at the outer edge or end 49 thereof in a manner hereinafter described, the bead 52 having its bottom 53 disposed substantially in the same plane as the grooved portion 50 thereof.

Therefore, it can be seen that the receptacle 43 of this invention has all of the advantages of the receptacles 18 and 26 previously described in connection with the curving side wall thereof and the strengthened peripheral flange thereof.

The method and apparatus of this invention for forming the receptacle 43 is generally indicated by the reference numeral 55 in FIGURES 13–20 and will now be described.

Figure 13:
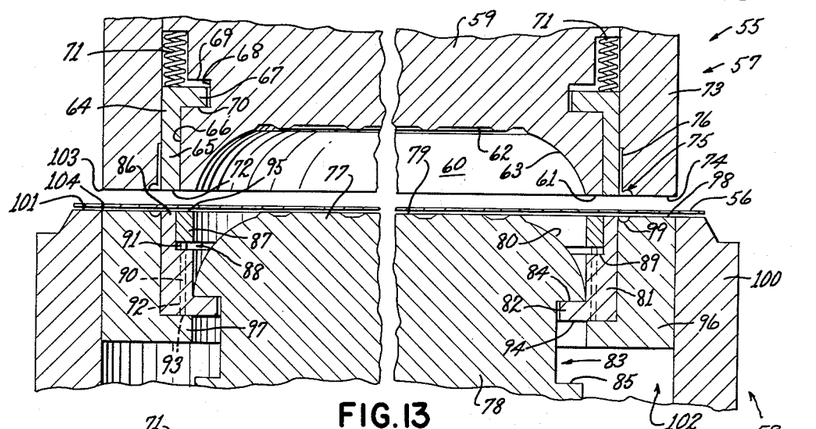
FIGURES 13–20 are cross-sectional views similar to FIGURES 6–9 and illustrate the method and apparatus of this invention for forming the receptacle of FIGURE 10.

As illustrated in FIGURE 13, a sheet of receptacle forming material 56 is adapted to be serially fed between cooperating die means 57 and 58 of the apparatus 55 of this invention in a conventional manner, the sheet of material 56 being adapted to have an unblanked portion thereof indexed inwardly into the drawing sheet having FIGURE 13 thereon.

The upper die means 57 of this invention includes an inner die member or former 59 having a cavity 60 interrupting the lower surface 61 thereof, the cavity 60 defining a substantially flat end wall 62 to form the bottom wall of the receptacle and an outwardly curving, concave side wall means 63 to define the curving side walls of the receptacle 43 in a manner hereinafter described.

A step ring or outer die member 64 forms part of the die means 57 and has an annular portion 65 disposed in sliding engagement with the outer cylindrical peripheral surface 66 of the former 59, the step ring 64 having an inwardly directed flange 67 loosely received in an annular channel 68 formed in the former 59 and defining opposed shoulders 69 and 70 thereof.

Very light compression spring means 71 are disposed between the former 59 and the step ring 64 to tend to urge the step ring 64 downwardly until the flange 67 thereof abuts the shoulder 70 whereby the end surface 72 of the step ring 64 is disposed substantially flush with the end surface 61 of the former 59. However, the step ring 64 can be moved upwardly relative to the former 59 in opposition to the force of the compression spring means 71 until the flange 67 thereof abuts the shoulder 69 of the former 59 for a purpose hereinafter described.

The die means 57 of this invention includes an outer annular punch or bead forming member 73 disposed outside of the members 59 and 64 for a purpose hereinafter described, the bead forming member 73 having a lower surface 74 normally disposed in the same plane as the surfaces 72 and 61 of the members 64 and 59 in the manner illustrated in FIGURE 13 but being adapted to be moved relative thereto in a manner hereinafter described.

The end surface 74 of the bead forming member 73 has the inner peripheral edge thereof cut away to define a substantially semi-circular groove 75 for a purpose hereinafter described, the groove 75 being interconnected to internal peripheral slot means 76 formed in the bead forming member 73 for a purpose hereinafter described.

The lower die means 58 of the apparatus 55 of this invention includes an inner member or former 77 held stationary in any suitable manner. For example, the lower portion 78 of the former 77 could be formed separately therefrom and comprise a lower riser block that can be secured to the upper part 77 thereof in any suitable manner or the upper and lower portions 77 and 78 can be formed integrally in the manner illustrated.

In any event, the former 77 has a substantially flat surface 79 adapted to cooperate with the surface 62 of the die means 57 to form the bottom of the receptacle 43 in a manner hereinafter described.

If desired, the surfaces 79 and 62 of the formers 77 and 59 can be suitably embossed to provide the desired embossing on the bottom of the receptacle 43 in the manner illustrated in FIGURE 10.

The former 77 of the die means 58 has an outwardly curving, convex side surface 80 adapted to cooperate with the surface 63 of the die means 57 to form the curving side wall means of the receptacle 43 in a manner hereinafter described.

An outer die member or draw ring 81 forms part of the die means 58 and is movable relative to the former 77, the draw ring 81 having an inwardly directed flange 82 receivable in an annular groove 83 formed in the former 77 and defining opposed shoulders 84 and 85 thereof.

In this manner, when the draw ring 81 is moved upwardly in a manner hereinafter described, upward movement thereof is limited by the shoulder 84 of the former 77 whereby when the draw ring 81 has been moved upwardly to its uppermost position, the upper surface 86 thereof is disposed in substantially the same plane as the upper surface 79 of the former 77 for a purpose hereinafter described.

Conversely, downward movement of the draw ring 81 relative to the former 77 is limited by the flange 82 of the draw ring 81 abutting the shoulder 85 thereof for a purpose hereinafter described.

The die means 58 includes a step ring or die member 87 disposed intermediate the inner die member 77 and the outer die member 81 and is received in an annular groove 88 formed in the draw ring 81, the groove 88 defining a shoulder 89 that limits downward movement of the step ring 87 relative to the draw ring 81 in a manner hereinafter described.

A plurality of push rods 90 are carried by the step ring 87 and project downwardly from the bottom surface 91 thereof through suitable apertures 92 formed through the draw ring 81, the rods 90 respectively having free ends 93 normally disposed flush with the end surface 94 of the draw ring 81 when the upper surface of the step ring 87 is disposed in the same plane as the end surfaces 86 and 79 of the members 81 and 77 for a purpose hereinafter described.

The die means 58 includes an outer draw ring or bead forming member 96 adapted to be moved relative to the other die members of the die means 58, the bead forming member 96 having an inwardly directed flange 97 adapted to engage the surface 94 of the draw ring 81 to prevent the step ring 87 from moving from the position illustrated in FIGURE 13 as the flange means 97 of the bead forming member 96 engages the ends 93 of the push rods 90 for a purpose hereinafter described. However, the bead forming member 96 is adapted to move downwardly beyond the shoulder 85 of the former 76 for a purpose hereinafter described.

When the bead forming member 96 is disposed in the position illustrated in FIGURE 13, the same has an upper surface 98 disposed in the same plane as the upper surfaces 86, 95 and 79 of the die members 81, 87 and 77 for a purpose hereinafter described.

The inner, upper, peripheral corner of the bead forming member 97 is provided with a substantially semi-circular groove 99 which is adapted to cooperate with the groove 75 of the upper bead forming member 73 to form the annular bead 52 of the receptacle 43 in a manner hereinafter described.

An outer blanking ring or die member 100 completes the die means 58 and is held stationary in the same manner as the former 77, the blanking ring 100 having an upper surface 101 disposed in the same plane as the upper surface 79 of the former 77 for the purpose hereinafter described.

The blanking ring 100 forms a cavity 102 with the former 77 whereby the cavity 102 can be supplied with suitable fluid pressure in desired time sequence in a manner hereinafter described to hold all of the die parts 96, 81 and 87 in the position illustrated in FIGURE 13.

The operation of the apparatus and method 55 of this invention will now be described.

Assuming that an unblanked portion of the sheet of material 56 has been indexed between the opened die means 57 and 58 of the apparatus 55 in the manner illustrated in FIGURE 13, the upper die means 57 is progressively moved downwardly until the surfaces 61, 72 and 74 of the members 59, 64 and 73 thereof make the contact with the sheet of material 56 and compact the same against the surfaces 95, 86 and 98 of the die members 87, 81 and 96 of the lower die means 58 to cause movement thereof downwardly relative to the former 77. As the sheet of material 56 is moved downwardly, the outer peripheral edge 103 of the upper bead forming member 73 cooperates with the inner peripheral edge 104 of the blanking member 100 of the lower die means 58 to sever a circular blank 105 from the sheet of material 56 in the manner illustrated in FIGURE 14.

Figure 14:
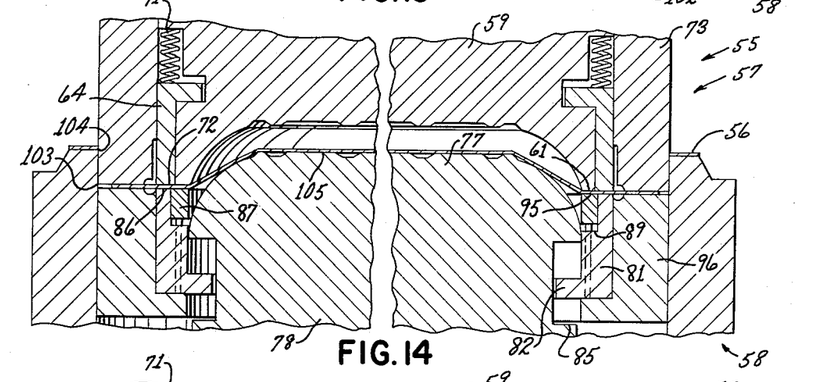

As illustrated in FIGURE 14, as the upper die parts 59, 64 and 73 of the upper die means 57 continues to move in unison in a downward direction relative to the former 77 to cause simultaneous movement of the die members 87, 81 and 96 of the lower die means 58 therewith, the upper former 59 and the lower former 77 begin to cooperate together to form the blank 105 in its cup-shaped configuration as illustrated in FIGURE 14 while the surface 61 of the die member 59 and surface 72 of the member 64 respectively cooperate with the surfaces 95 and 86 of the die members 87 and 81 to form the peripheral flange of the receptacle 43.

Figure 15:
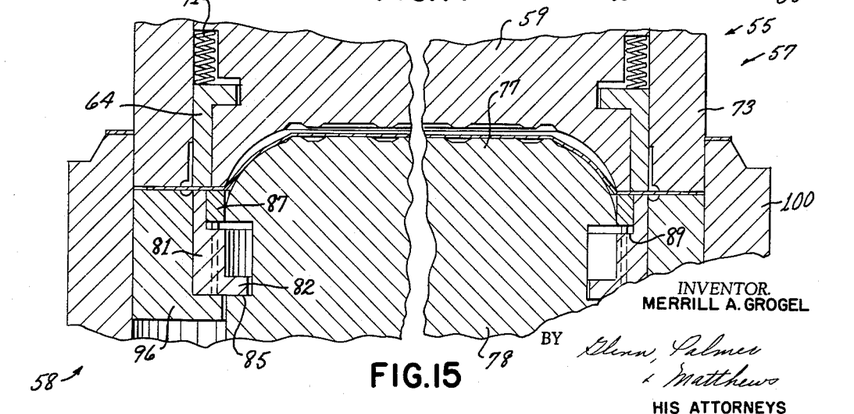

The die members 87 and 81 of the lower die means 58 are continued to be moved downwardly by the die members 59 and 64 of the upper die means 57 until the flange 82 of the die member 81 of the die means 58 abuts the shoulder 85 of the former 77 in the manner illustrated in FIGURE 15 whereby further movement of the die member 81 and the upper step ring 64 of the die means 58 and 57 is terminated. However, the upper die member 59 and bead forming member 73 thereof are adapted to further move downwardly to cause the die member 87 and bead forming member 96 of the die means 58 to move downwardly therewith until the die member 87 abuts against the shoulder 89 of the now stationary die member 81 in the manner illustrated in FIGURE 16 whereby the cooperating surfaces 61 and 95 of the die members 59 and 87 cooperate together to form the ungrooved portion 51 of the peripheral flange 46 of the receptacle 43 while the cooperating surfaces 86 and 72 of the die members 81 and 64 form the grooved portion 50 of the peripheral flange 46 of the receptacle 43 for a purpose previously described, the step ring 64 of the upper die means 57 permitting such relative movement between the die member 59 and itself by compressing the spring means 71 until the flange 67 thereof abuts the shoulder 69 of the former 59 in the manner illustrated in FIGURE 16.

Figure 16:
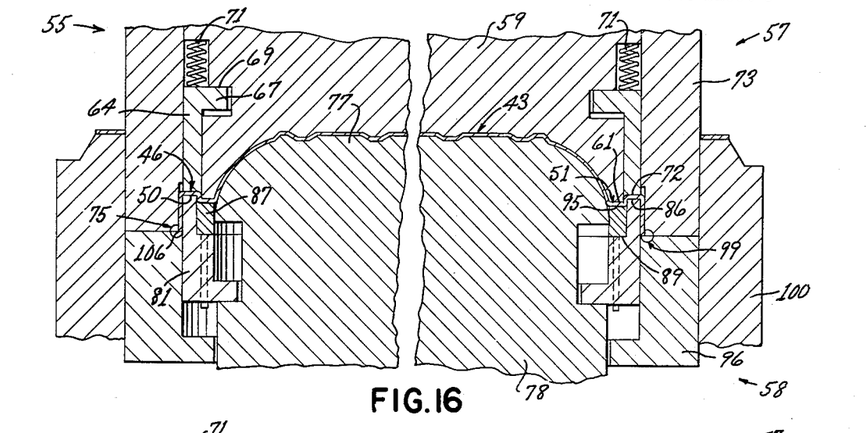

At this time, that is, when the die member 87 is against the shoulder 89 of the die member 81 and the flange means 67 of the step ring 64 is against the shouder 69 of the former 59, downward movement of the former 59 is terminated as the same has fully cooperated with the former 77 to complete the bottom wall and side wall means of the receptacle 43 in the manner illustrated in FIGURE 16.

However, the bead forming members 73 of the upper die means 57 continue to move downwardly to carry the bead forming member 96 downwardly therewith until the same reach the position illustrated in FIGURE 16 whereby the peripheral edge 106 of the blank 105 is fully received in the cooperating grooves 75 and 99 of the bead forming members 73 and 97 in the manner illustrated in FIGURE 16.

Figure 17:
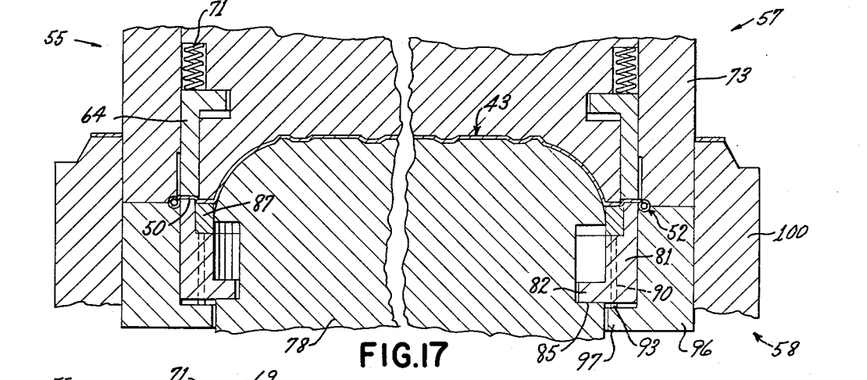

Thereafter, the bead forming member 73 of the die means 57 is moved upwardly and the bead forming member 96 of the lower die means 58 is moved upwardly in unison therewith by fluid pressure means being directed into the cavity 102 in the manner previously described whereby when the bead forming member 96 has reached the position illustrated in FIGURE 17 to have the flange 97 thereof abut the free ends 93 of the push rods 90, the bead forming members 73 and 96 have completed the formation of the bead 52 for the receptacle 43.

Figure 18:
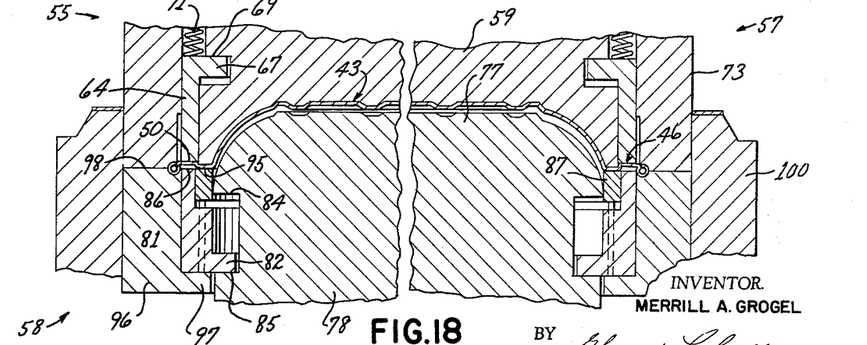

At this time, the die member 59 is moved upwardly at the same rate as the bead forming member 73 and the lower bead forming member 96 moves upwardly in unison therewith under the influence of fluid pressure in the cavity 102 to simultaneously move the die member 87 upwardly to the position illustrated in FIGURE 18 whereby the surfaces 95, 86 and 98 of the die members 87, 81 and 96 are again disposed in the same plane, whereby the completed receptacle 43 is lifted above the former 77 as illustrated in FIGURE 18.

Since the stepped portion 50 of the receptacle 43 is now raised above the forming surface 86 of the die member 81, it would seem that the force of the compression spring means 71 of the step ring 64 of the upper die means 57 would tend to ungroove the grooved portion 50 of the peripheral flange 46 of the receptacle 43.

However, it has been found that once the stepped portion 50 has been formed in the peripheral flange 46 of the receptacle 43, the spring means 71 is so slight that the same cannot remove the stepped portion 50 of the peripheral flange 46 of the receptacle 43 so that the stepped portion 50 holds the step ring 64 in its upward position against the shoulder 69 of the former 59 during the separation of the die means 57 and 58.

Figure 19:
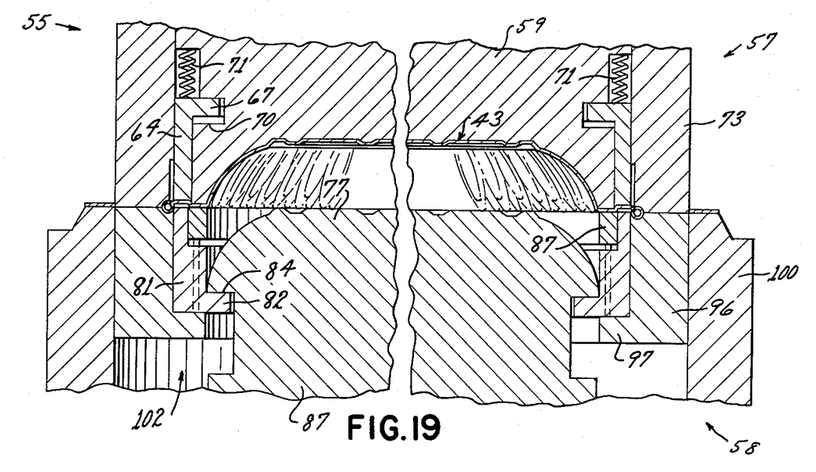

The die means 59, 64 and 73 of the upper die means 57 are continued to be moved upwardly from the position illustrated in FIGURE 18 and the die means 87, 81 and 96 of the lower die means 58 follow along in unison therewith because of the fluid pressure acting against the bottom surface of the die means 96, the flange means 97 of the die member 96 carrying the die members 81 and 87 in unison therewith until the flange 82 of the die member 81 again engages the shoulder 84 of the former 77 to terminate upward movement of the die members 87, 81 and 96 in the manner illustrated in FIGURE 19.

Figure 20:
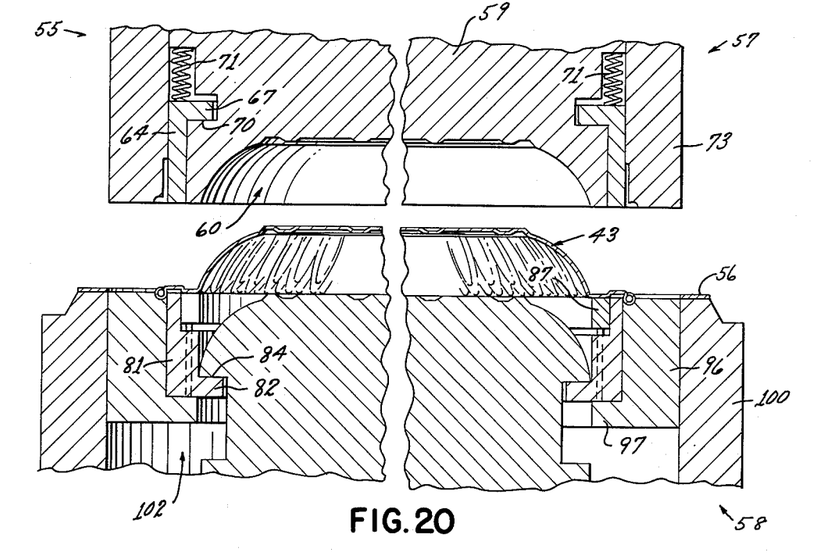

Thereafter, the die members 59, 64 and 73 of the upper die means 57 continue to move upwardly back to the position illustrated in FIGURE 13 whereby the spring means 71 now urge the die member 64 downwardly against the shoulder 70 of the former 59 to eject the receptacle 43 from the cavity 60 of the upper die means 57 whereby the ejected receptacle 43 is adapted to drop downwardly on the lower die means 58 in the manner illustrated in FIGURE 20.

With the ejected receptacle 43 disposed in the position illustrated in FIGURE 20, the same is adapted to be removed from the apparatus 55 in any suitable manner.

For example, when the blanked portion of the sheet of material 56 is again indexed inwardly into the sheet of drawings containing FIGURE 20 to bring an unblanked portion thereof between the die means 57 and 58, the same will carry the completed receptacle 43 therewith so that the same is removed from between the die means 57 and 58 whereby the die means 57 and 58 can complete another receptacle 43 in the above manner.

Therefore, it can be seen that the receptacle 43 of this invention can be formed in a relatively simple and effective manner to provide a receptacle having increased structural strength in the peripheral flanges thereof to permit the same to be readily handled by pie-filling machinery and the like.

Further, it can be seen from FIGURES 13–16 that the formers 59 and 77 cooperated together to progressively wrap the sheet material about the former 77 to control the wrinkles in the receptacle 43 in the same manner and for the same purpose as described in connection with the apparatus 31. For example, see the substantial uniformity of the wrinkle pattern in the side wall means of the receptacle 43 in FIGURES 10–12.

Accordingly, this invention provides improved cup-shaped receptacles as well as improved methods and apparatus for making such receptacles or the like.

While the form of the invention now preferred has been disclosed as required by the statutes, other forms may be used, all coming within the scope of the claims which follow.

What is claimed is:

1. A receptacle having bottom wall means and having side wall means integrally interconnected to said bottom wall means and defining an open end of said receptacle at the outer edge means of said side wall means, said side wall means curving outwardly and upwardly from said bottom wall means throughout the height thereof to cause said outer edge means to be disposed substantially vertically, said side wall means having an outwardly directed peripheral flange interconnected to said outer edge means thereof, said peripheral flange making an acute angle with said substantially vertically disposed outer edge means.

2. A receptacle having bottom wall means and having side wall means integrally interconnected to said bottom wall means and defining an open end of said receptacle at the outer edge means of said side wall means, said side wall means curving outwardly and upwardly from said bottom wall means throughout the height thereof to cause said outer edge means to be disposed substantially vertically, said side wall means having an outwardly directed peripheral flange interconnected to said outer edge means thereof, said peripheral flange being disposed substantially horizontally and being grooved intermediate its ends to add structural strength to said perhipheral flange and to define a bottom wall of said groove, said peripheral flange having a curled bead at the outer end thereof and said bottom wall of said groove being substantially co-planar with the bottom of said bead.

3. A receptacle formed from a sheet of metallic foil and having a substantially flat bottom wall means and a side wall means integrally interconnected to said bottom wall means and defining an open end of said receptacle at the outer edge means of said side wall means, said side wall means progressively curving outwardly and upwardly from said bottom wall means throughout the height thereof to cause said outer edge means to be disposed substantially prependicular to said bottom wall means, said side wall means having an outwardly directed peripheral flange interconnected to said outer edge means thereof, said peripheral flange making an acute angle with said outer edge means of said side wall means.

4. A receptacle formed from a sheet of metallic foil and having a substantially flat bottom wall means and a side wall means integrally interconnected to said bottom wall means and defining an open end of said receptacle at the outer edge means of said side wall means, said side wall means progressively curving outwardly and upwardly from said bottom wall means throughout the height thereof to cause said outer adge means to be disposed substantially perpendicular to said bottom wall means, said side wall means having an outwardly directed peripheral flange interconnected to said outer edge means thereof, said peripheral flange being disposed substantially horizotnally and being grooved intermediate its ends to add structural strength to said peripheral flange and to define a bottom wall of said groove, said peripheral flange having a curled bead at the outer end thereof and said bottom wall of said groove being substantially coplanar with the bottom of said bead.

References Cited by the Examiner
UNITED STATES PATENTS

| | | | |
|---|---|---|---|
| 2,669,914 | 2/1954 | Swaine | 93—51 |
| 2,673,805 | 3/1954 | Colman | 229—3.5 |
| 2,775,383 | 12/1956 | Kollman et al. | 229—3.5 |
| 2,777,601 | 1/1957 | Cheeley | 220—74 |
| 2,924,369 | 2/1960 | Richter | 229—3.5 |
| 3,004,685 | 10/1961 | Hennies | 229—3.5 |
| 3,053,152 | 9/1962 | Saidel et al. | 93—51 |

JOSEPH R. LECLAIR, *Primary Examiner.*

FRANKLIN T. GARRETT, *Examiner.*